(12) United States Patent
Huang

(10) Patent No.: US 9,215,785 B2
(45) Date of Patent: Dec. 15, 2015

(54) NETWORK CONNECTION DEVICE BASED ON LIGHT SOURCE

(75) Inventor: Jung-Tang Huang, Taipei (TW)

(73) Assignee: INTERNATIONAL MOBILE IOT CORP., Taipei (TW)

( * ) Notice: Subject to any disclaimer, the term of this patent is extended or adjusted under 35 U.S.C. 154(b) by 620 days.

(21) Appl. No.: 13/563,740

(22) Filed: Aug. 1, 2012

(65) Prior Publication Data

US 2013/0033178 A1    Feb. 7, 2013

(30) Foreign Application Priority Data

Aug. 2, 2011    (TW) .............................. 100214225 U

(51) Int. Cl.
*H05B 37/02*    (2006.01)
(52) U.S. Cl.
CPC .............. *H05B 37/0272* (2013.01); *Y02B 20/48* (2013.01)
(58) Field of Classification Search
CPC ........... H05B 37/0245; H05B 37/0263; H05B 37/0272

USPC ........... 315/86, 149, 152, 153, 154, 155, 156, 315/157, 158, 159
See application file for complete search history.

(56) References Cited

U.S. PATENT DOCUMENTS

| | | | |
|---|---|---|---|
| 8,013,545 B2 * | 9/2011 | Jonsson | 315/318 |
| 8,035,320 B2 * | 10/2011 | Sibert | 315/312 |
| 8,203,445 B2 * | 6/2012 | Recker et al. | 340/531 |
| 8,344,665 B2 * | 1/2013 | Verfuerth et al. | 315/315 |
| 8,653,935 B2 * | 2/2014 | Baker | 340/3.2 |

* cited by examiner

*Primary Examiner* — Jeffrey Zweizig
(74) *Attorney, Agent, or Firm* — Jianq Chyun IP Office

(57) ABSTRACT

This invention reveals an indoor network connection device. This device is combined by indoor light source and master node module, which can effectively decrease the cost of setting up indoor web facilities and make ideal of smart architecture come true. In addition, setting up these web connecting devices can easily let other web users in and even to become micro-network achieving the goal of sharing resource.

15 Claims, 3 Drawing Sheets

NETWORK CONNECTION DEVICE BASED ON LIGHT SOURCE

FIELD OF THE INVENTION

The present invention relates generally to the field of an indoor network device. More specifically the present invention makes good use of building itself indoor light sources to combine a master node module that has network function and corresponding slave node to set up indoor wireless network environment.

BACKGROUND OF INVENTION

Smart architecture, as the word said, is setting up network in a building and connecting every node device through Internet to achieve control and information exchange. Internet Of Things, IOT, or Machine to Machine, M2M, are some examples. The establishment of IOT now in use mainly utilizes Zigbee, Bluetooth, WiFi, or 3G. However, each of them has its advantage and disadvantage. Power consumption, cost, penetration rate, convenience of setting up, flexibility, and mesh networking capability should all be considered, especially penetration rate. If penetration rate is high, it is easy to achieve "every object has a communication node," which is the essential part of IOT. On the contrast, if there's no ubiquitous communicable node, then there's no IOT.

Bluetooth or WiFi are the most popular choices for communication. However, they only exist in computers, some computer interface peripherals, notebooks, mobile phones, tablets, etc. Normal electrical appliances don't have Bluetooth or WiFi. Even if some appliances have Bluetooth or WiFi, these appliances are not be placed everywhere in a building. Thus it is not enough to become mesh network.

Currently, TV and refrigerator are necessary 'appliances' in every family but most of them don't have network communication function. As a consequence, there is a big improvement gap of establishment of IOT or M2M. Maybe, in the future, web TV and web refrigerator will become necessities in every family step by step, so using web TV and web refrigerator as server and router is a reasonable assumption. However, there is not a web TV or a web refrigerator in every room and they are expensive. Thus, using web TV and web refrigerator as server and router to establish IOT is not possible. To overcome the problem, proposing a new and convenient network node which uses existed facility to construct IOT is needed to make every kinds of indoor space be easily to set up IOT instead of buying network routing facilities.

SUMMARY

Due to previous explanation, the present invention is to provide a low cost and high penetration rate, network communication device. People don't need to spend extra money to buy network routing facilities but can easily set up an indoor network.

According to one embodiment of the present invention which is based on indoor light sources and combines with master node module that has network connection function, it can connect with outer internet network. Indoor devices with master node module can use network connection devices to become Piconet.

According to another embodiment of the present invention which is based on indoor wireless connection device, each of them is placed in every single space in the architecture and accommodates network users in the space to become indoor wireless system. Each user in every single space uses first wireless network communication means to communicate with one another and each single space use second wireless network communication means to communicate.

BRIEF DESCRIPTION OF DRAWINGS

The detailed drawings of this invention will be fully understood from the following descriptions wherein.

The following description should be read with reference to the drawings, in which like elements in different drawings are numbered in like fashion. The drawings, which are not necessarily to scale, depict selected embodiments and are not intended to limit the scope of the invention. Although examples of construction, dimensions, and materials are illustrated for the various elements, those skilled in the art will recognize that many of the examples provided have (suitable alternatives that may be utilized.

DETAILED DESCRIPTION OF THE INVENTION

Figure 1:
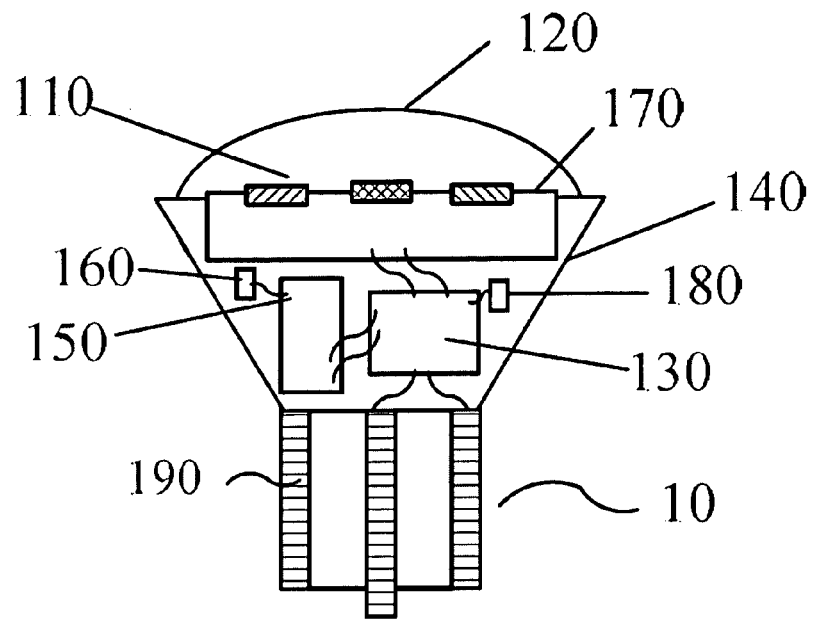
FIG. 1 is a schematic diagram showing an exemplary network connection device based on light resource.

First of all, referring to FIG. 1, it shows the cross-section diagram of one embodiment of the present invention, network connection device 10 based on light source. It includes an illumination control circuit 110, a lampshade 120, a power conversion module 130, a holder 140, a master node module 150, a detection circuit 160, a light source 170, a battery module 180 and a light source standard connector 190. The advantages of using light source as a basis for network connection device or IOT node are: 1. no more modification of the original interior decoration, but can set indoor network at any time in old or new building, no additional wiring is needed; 2. no power cord supply issues; 3. light source is usually located at the center and the highest position of room, which can transmit and receive signals without being blocked and the antenna design is easy; 4. can combine with environmental illumination sensor to determine the degree of outside brightness and decide the number of turn-on light source, providing illumination with smart energy conservation.

Please continue to refer to FIG. 1. The master node module 150 has function of the wireless network connection; its interior is mainly divided into many parts: a control unit, a transceiver, and an antenna (the above are not shown in the figure). The master node module 150 can continuously radiate electromagnetic wave of specific frequencies in a space, and collect web information and manage communication protocol with control unit. In the application of a radio frequency transmission system, the master node module 150 is mainly used as electromagnetic energy emitter, coupled with other slave nodes being the receiving objects to become the broadcast-type radio frequency transmission system. Users or devices that comply with communication protocol can join as slave node if detected and identified by the master node module 150. Communication protocol can be (but not limited to) Bluetooth that is set in accordance with Personal Area Network (Wireless PAN) technical standards and WiFi transmission that based on the wireless LAN (WLAN) technology standards. In response to the different characteristics of users, for example, users may be persons with hand-held portable communication devices, or computer peripherals, or home appliances, etc. Master node module 150 can automatically use the network addressing function (such as an IPv6 Network Protocol version 6) to divide users into different groups. Users in the same group use first means of transmission to communicate with one another. In one application, the first transmission is Bluetooth. Users in the same group form a Piconet. In addition, the master node modules 150 in different indoor space use second transmission mode to communicate with one another. In another application, the second transmission means is WiFi transmission.

Continuing to refer to FIG. 1, the detection circuit 160 can automatically detect the environment changes in a space, for example, if a person wearing a Bluetooth device walks into the space, the detection circuit 160 can detect the signal changes and determine the user that wears a Bluetooth device is a moving person rather than a static object. The detection data can be uploaded to the network and send a drive signal to the illumination control circuit 110, so when the person enters the room, the lighting source 170 will be automatically on. In addition, the detection circuit 160 can also detect other environmental changes, such as the brightness of an indoor space, temperature, humidity, gas composition, suspended or airborne pathogens and so on. The detected information can be uploaded to the network by the master node module 150 to achieve the purpose of resource sharing and remote monitoring.

Please continue to refer to FIG. 1. In one embodiment, the light source 170 is a light emitting diode (LED). The illumination control circuit 110 has a Pulse Width Modulation (PWM) function which can control the color and brightness of the light source 170 output. In an application, the illumination control circuit 110 contains a chip with hardware to provide the PWM function; in other applications, the illumination control can be reached by writing firmware, or connecting to an external PWM circuit. The lampshade 120 is used to protect the internal components of network connection device 10 and make the light source 170 have uniform illumination, and the material of lampshade 120 can make the wireless signals transmitted by master node module 150 easily penetrate. The power conversion module 130 can convert AC power into DC power, for example, output 2~5V DC power to provide light source 170 and the master node module 150 to use. When there is a power outage or power off, the battery module 180 provides, direct current to the light source 170 and the master node module 150 to use. For each of these components, the holder 140 provides protection and a fixed function. Network connection device 10 is installed to the lamp holder through a standard connector 190 of light source. The installation way can but is not limited to rotating or snapping, and this light source standard connector 190 can be regulated in accordance with existing laws and a variety of lamp holders manufacturing.

Figure 2:
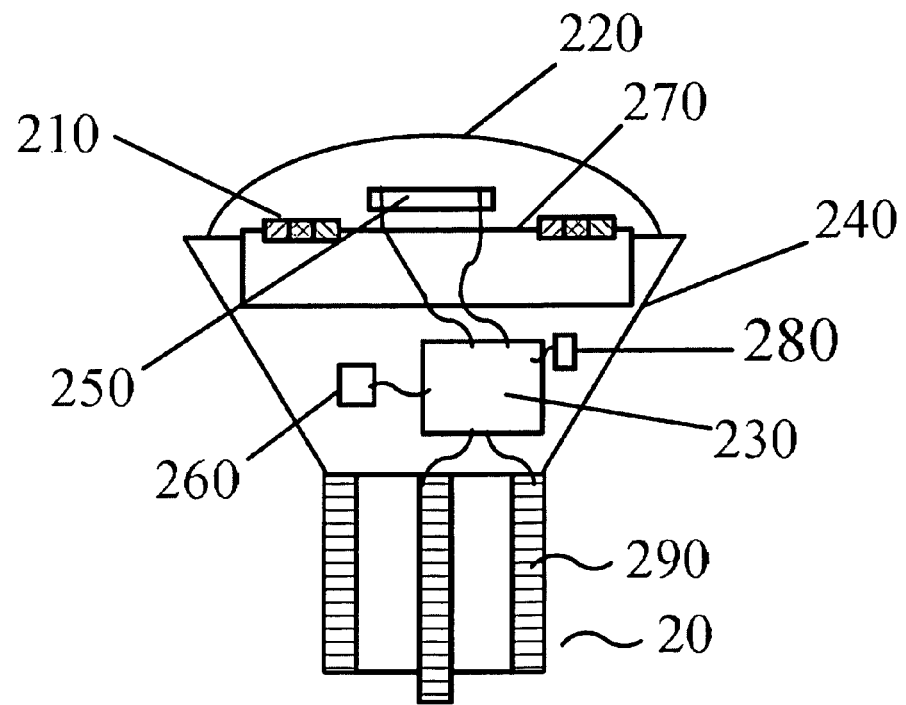
FIG. 2 is a schematic diagram showing another exemplary network connection device based on light resource.

Referring to FIG. 2, network connection device 20 structure in FIG. 2 is similar to FIG. 1, it also includes an illumination control circuit 210, a lampshade 220, a power conversion module 230, a holder 240, a master node module 250, a detection circuit 260, a light source 270, a battery module 280 and a light source standard connector 290. The difference between FIG. 2 and FIG. 1 is that the light source 170 in FIG. 1 is a light source with lower power, emitting a relatively low heat. Thus the holder 140 can be made of plastic material. The light source 270 in FIG. 2 is a light source with higher power, emitting a relatively high heat, the holder 240 may be made of metal material, resulting in the wireless signal sent by the master node module 250 can't penetrate. Under such circumstances, the master node module 250 can be set out of the holder 240, making the wireless signal sent by the master node module 250 not be blocked by the holder 240 made of metal material. Take FIG. 2 for example. We can use pin socket to elevate master node module 250 above the light source 270 and the illumination control circuit 210. In addition, the master node module 270 may still be fixed on the holder 240, but its antenna (not shown in the figure) may extend out of the light source 270. Network connection device 20 is installed to the lamp holder through a standard connector 290 of light source. The installation way can be, but is not limited to rotating or snapping, and this light source standard connector 290 can be regulated in accordance with existing laws and a variety of lamp holders manufacturing.

Figure 3:
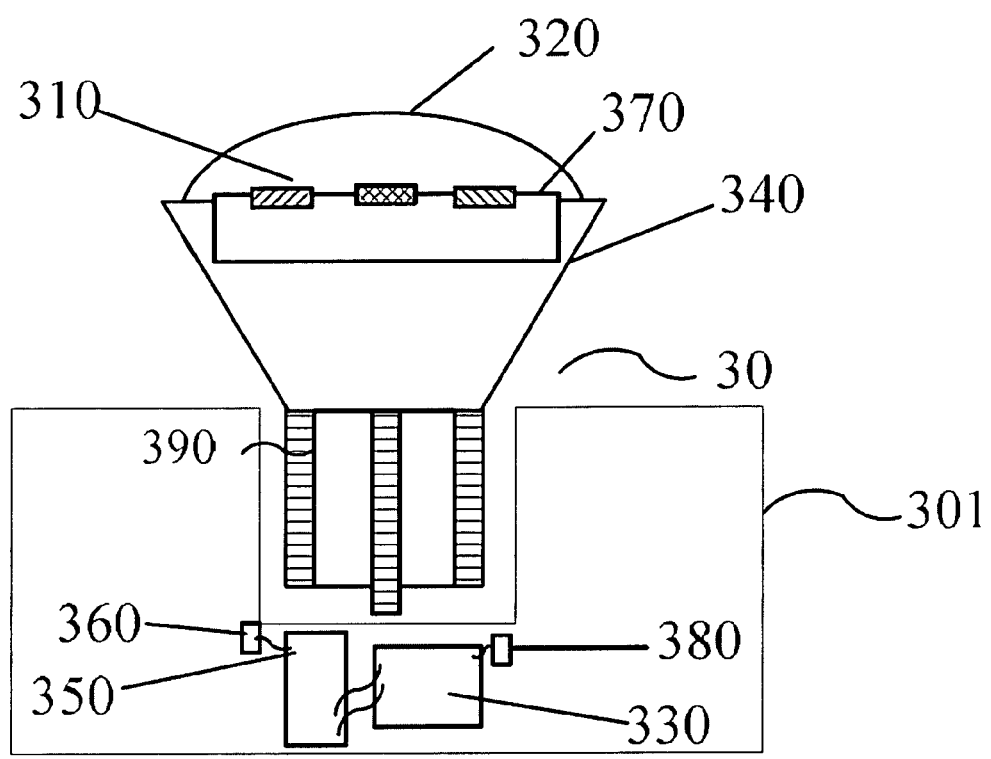
FIG. 3 is a schematic diagram showing the other exemplary network connection device based on light resource.

Referring to FIG. 3, it shows cross-sections of network connection device 30 based on the light source in accordance with another embodiment of this invention. The network connection device 30 comprises a lighting control circuit 310, a lampshade 320, a power conversion module 330, a holder 340, a master node module 350, a detection circuit 360, a light source 370, a battery module 380 and a light source standard connector 390. Comparing with the above-mentioned embodiments, this embodiment sets the power conversion module 330, the master node module 350, the detection circuit 360 and the battery module 380 in the lamp holder 301. This embodiment may apply to offices and other places with lamp holders accommodating multiple light tubes or light bulbs. In this way, there is no need to retrofit in the per a lamp source with a set of parts including the power conversion module 330, the main node module 350, the detect circuit 360 and the battery module 380. Instead, it only needs to install the above set of parts in the lamp holders, thus can effectively reduce costs. The realization of this embodiment is the same as the above networking functions of the above-mentioned network connection device 10 or 20, it will not repeat the description here.

Figure 4:
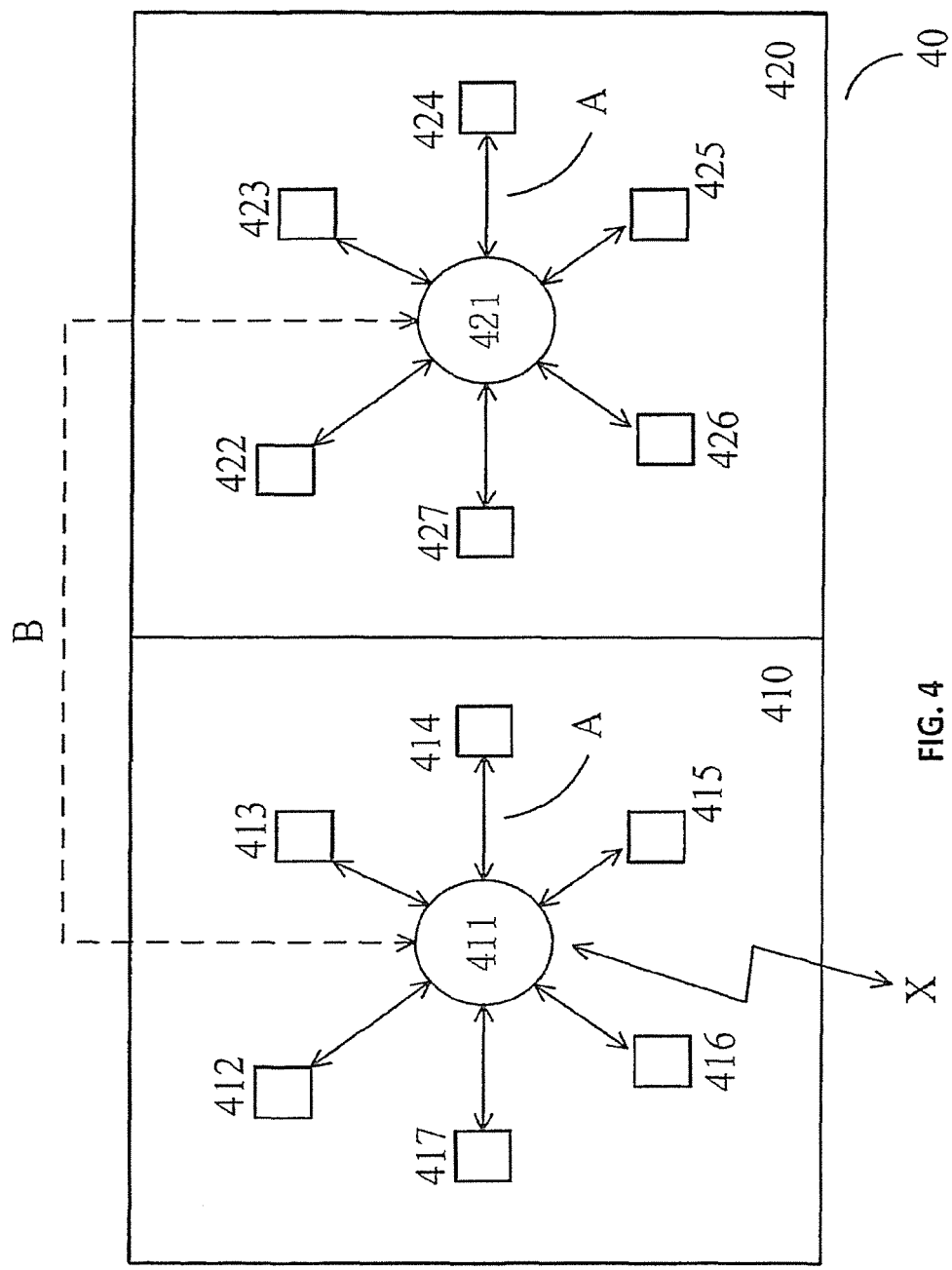
FIG. 4 is an embodiment of a kind of indoor wireless network system.

Referring to FIG. 4, it illustrates the structure of an indoor wireless network system proposed in accordance with another embodiment of the invention. A building interior spade 40 is divided into two separate spatial units 410 and 420 (confine to the scope of the drawing, only draw two independent spatial units in the figure, but the actual situation is not limited). First, take independent space 410 for example. It contains a network connection device 411 and a plurality of slave node modules 412~417. Network connection device 411 is mainly combined by a master node module and a light source. The power required can be provided by the power of the light source.

Please continue to refer to FIG. 4. Network connection device 411 has wireless connection function, such as (but not limited to), Bluetooth that is set according to personal LAN technology standards, and WiFi transmission that is set according to wireless LAN technology standards. Any users/ devices that comply with communication protocol said previously can join as slave nodes if detected and identified by network connection device 411, such as nodes 412~417 in FIG. 4. The network connection device 411 network can automatically use the network addressing function to divide users/devices into different groups. Slave nodes 412~417 use first means of transmission A to communicate with network connection devices 411. In one application, the first transmission A can be Bluetooth. Slave nodes in the same group form a Piconet.

Please continue to refer to FIG. 4. The internal distribution of independent space 420 is the same with the independent space 410's. Network connection device 421 uses first transmission means A to communicate with slave nodes 422~427, and uses second transmission means B to communicate with network connection device 411. In an application, the second transmission means B may be WiFi transmission. The network connection device 411 may connect to external Network X and make each slave node 412~417, 422~427 connect to the Network. In addition, network connection devices 411, 421 may even include a detection circuit that can detect environmental changes, such as in and out of a person or many persons, the degree of brightness, temperature, humidity, gas composition, suspended or airborne pathogens, etc. These detected data addition not only can be the basis of adjustment of brightness of light source and ON/OFF, but also can use network connection devices 411, 421 to upload to the external Network X and slave node modules 412~417, 422~427 to achieve resource sharing and purpose of remote monitoring.

Please continue to refer to FIG. 4. The second transmission means B can not only use WiFi, but can use the power line communication (PLC), or use power line communication network as an alternate network. The biggest advantage of using power line communication is that power line is the largest infrastructure; there is at least a power outlet in every corner of the house, making it covers the entire network. Bus structure using on PLC makes one controller has the ability to control multiple devices. The controller can keep track of all devices on the network, and provides Plug and Play function. If any new equipment is installed, it can immediately become part of the network.

Having thus described the several embodiments of the present invention, those of skill in the art will readily appreciate that other embodiments may be made and used which fall within the scope of the claims attached hereto. Numerous advantages of the invention covered by this document have been set forth in the foregoing description. It will be understood that this disclosure is, in many respects, only illustrative. Changes may be made in details, particularly in matters of shape, size and arrangement of parts without exceeding the scope of the invention.

What is claimed is:

1. A network connection device comprising:
   at least one light source;
   at least one illumination control circuit which controls the color and brightness of the at least one light source's output;
   at least one power transform module, which electrically connects to AC power and has capability to adjust voltage and current for output of DC power to the at least one light source;
   at least one first node module, which electrically connects said power transform module and said illumination control circuit; said first node module uses at least one wireless communication means and automatically identifies at least one second node that uses the same wireless communication means,
   wherein the wireless communication means of said first node module is Bluetooth, WiFi (Wireless Fidelity) communication, or combination thereof,
   wherein the network connection device further comprises at least a sensor configured to detect environmental changes and output some detected information,
   wherein said sensor electrically connects with the first node module and the detection information is uploaded to a network by the first node module.

2. The network connection device according claim 1 wherein the at least one second node comprises two or more second nodes, the first node module automatically classifies those second nodes with different characters into different wireless network groups and said first node module uses the same wireless communication means to communicate with those second nodes in the same wireless network group.

3. The network connection device according claim 1 wherein the at least one light source is a Light-Emitting Diode, LED.

4. The network connection device according claim 1 wherein the illumination control circuit uses Pulse Width Modulation, PWM to control the at least one light source's output of color and brightness.

5. The network connection device according claim 2 wherein the wireless network group consist of two or more second nodes is a Piconet.

6. The network connection device according claim 1, wherein said sensor further electrically connects with the illumination control circuit; and wherein said sensor detects the environmental changes and outputs said some detected information to make the illumination control circuit uses the detection information to output a drive signal to control on/off or brightness of the at least one light source.

7. The network connection device according claim 6 wherein the detection information includes temperature, humidity, gas composition, and airborne pathogen.

8. The network connection device according claim 1 further comprising a battery module which is used as a power back-up when there is a power outage or power off.

9. The network connection device according claim 1 further comprising a lamp holder, wherein said first node module, said power transform module, and said illumination control circuit are all set up in said lamp holder.

10. An indoor wireless network system comprising,
    two or more network connection devices, wherein every device contains a first node module and one light source and the first node module is electrically connected to the light source; and
    at least one second node;
    wherein every network connection device uses first communication means to communicate with the at least one second node and the network connection devices use second communication means to communicate with one another,
    wherein the first communication means is Bluetooth and is different to the second communication means,
    wherein the indoor wireless network system further comprises at least a sensor configured to detect environmental changes and output some detected information,
    wherein the detection information is uploaded to a network by the corresponding one of the network connection devices.

11. The indoor wireless network system according claim 10 wherein the at least one second node comprises two or more second nodes, and wireless network group consist of the second nodes is a Piconet.

12. The indoor wireless network system according claim 10 wherein the second communication means is WiFi communication.

13. The indoor wireless network system according claim 10 wherein the second communication means is power line communication, PLC.

14. The indoor wireless network system according claim 10, wherein said sensor electrically connects with an illumination control circuit; and wherein said sensor detects the environmental changes and outputs said some detected information to make the illumination control circuit uses the detection information to output a drive signal to control on/off or brightness of the light source.

15. The indoor wireless network system according claim 10 wherein the detection information includes temperature, humidity, gas composition, and airborne pathogen.

* * * * *